(12) United States Patent
Lukach, Jr. et al.

(10) Patent No.: US 7,025,078 B2
(45) Date of Patent: Apr. 11, 2006

(54) CLEAN-IN-PLACE VALVE AND VALVE SEAT

(75) Inventors: Arthur S. Lukach, Jr., East Hampton, NY (US); Joseph Nevadunsky, Bradley Beach, NJ (US)

(73) Assignees: Micromold Products, Inc., Yonkers, NY (US); De Dietrich Process Systems, Inc., Union, NJ (US)

( * ) Notice: Subject to any disclaimer, the term of this patent is extended or adjusted under 35 U.S.C. 154(b) by 0 days.

(21) Appl. No.: 10/992,438

(22) Filed: Nov. 17, 2004

(65) Prior Publication Data

US 2005/0103380 A1    May 19, 2005

Related U.S. Application Data

(60) Provisional application No. 60/520,774, filed on Nov. 17, 2003.

(51) Int. Cl.
*F16K 51/00* (2006.01)

(52) U.S. Cl. .................. 137/15.06; 137/240; 137/246; 137/312; 251/359

(58) Field of Classification Search ............... 137/312, 137/238, 240, 246, 15.04, 15.05, 15.06; 251/359, 251/360

See application file for complete search history.

(56) References Cited

U.S. PATENT DOCUMENTS

| | | | | |
|---|---|---|---|---|
| 4,377,892 A | * | 3/1983 | Gonzalez | 251/359 |
| 4,856,551 A | * | 8/1989 | Bräkelmann | 137/312 |
| 5,080,120 A | * | 1/1992 | Jordan | 137/312 |

\* cited by examiner

*Primary Examiner*—Kevin Lee
(74) *Attorney, Agent, or Firm*—Fulbright & Jaworski LLP

(57) ABSTRACT

A valve seat and a valve assembly incorporating such valve seat form tight dual seals with glass lined nozzle of a reagent or reaction vessel. This reduces or eliminates cavities and crevices between the value seat and the nozzle where residues or contaminants can accumulate. Additionally, the present valve assembly comprises flush ports to permit the valve seat and the valve to be cleaned-in-place. This eliminates the need to disassemble the valve seat and/or the valve to remove the contaminants, thereby minimizing process "down time."

13 Claims, 8 Drawing Sheets

CLEAN-IN-PLACE VALVE AND VALVE SEAT

RELATED APPLICATION

This application claims priority benefit under Title 35 U.S.C. § 119(e) of provisional application No. 60/520,774 filed on Nov. 17, 2003, which is incorporated by reference in its entirety.

FIELD OF THE INVENTION

The present invention relates to new valves, valve assemblies and valve components (collectively, "valves") that prevent or minimize the accumulation of contaminating residues in the region of these valves and that permit the removal of any that are present. There is no need to take the valve "off-line" and disassemble it for cleaning because build up of process residue is minimal or non-existent with the use of the present invention. Rather, the vessel and valve (together with other equipment integral to the process) may be cleaned-in-place. Additionally, for other sensitive applications, flush ports incorporated in the valve seat body allow cleaning of a normally inaccessible chamber of the valve housing, or in certain cases, filling such chamber with a hardening elastomer or plastic compound that will prevent entry of contaminants. The flush ports also permit positive testing of the clean-in-place sealing components of the valve. Singly, or in combination, these design features result in significant savings by minimizing the accumulation of process residues and eliminating the need for disassembling the valve, thereby minimizing the process "down time".

BACKGROUND OF THE INVENTION

Virtually all fluid handling industrial processes rely on valves and valve assemblies to regulate the inputs, outputs, and rates-of-flow of process ingredients. In some of these processes, extreme cleanliness is imperative to avoid contamination and meet quality requirements, standards and specifications. In certain industries, such as pharmaceutical, food, beverage, semi-conductor and others, such cleanliness is especially important. Commonly, the required cleanliness is maintained by periodic cleaning of process equipment and components (usually between batches).

In some valve designs, chambers or pockets are difficult to access, thereby making it difficult to clean the valves without disassembling the valve components. Such disassembly requirement of the valve increases the process "down-time". Disassembly may also result in damage to the valve components and valve assembly. One such example is a valve commonly used in the process vessels, such as glass-lined vessels. The bottom of such vessels are typically made with a cylindrical pipe or tube penetrating the vessel bottom and welded thereto. At the bottom of the pipe is a flare/flange that allows connection of other fluid handling components. The fluid contacting surfaces of this pipe and flare/flange are also glass-lined or coated. However, the glass lining is often uneven due to manufacturing limitations. This unevenness prevents the fluid-tight coupling of hard metal valve components with the glass lined nozzle. That is, the uneven glass surface leads to leaks, but tightening a hard metal valve to the nozzle (to stop leaks) leads to glass damage. Thus, to facilitate valve-to-nozzle coupling, valve seats are typically made of a relatively more flexible and soft (compared to glass) plastic material such as PTFE (polytetrafluoroethylene).

A flanged valve mechanism is typically utilized to control the fluid flow through a flanged nozzle. The valve mechanism includes a slightly smaller interior cylindrical member (the seat) that projects up from the bottom into the flared/flanged pipe, and which has a flange pressing against the glass-coated flare/flange surface (to prevent leakage at the bottom connection). The upper inside surface of this seat receives a glass-coated plunger that is attached to a glass coated valve stem projecting downward through the seat. The valve mechanism outside the vessel draws the plunger down into the seat, closing the valve. In reverse, the mechanism pushes the plunger up into the vessel, allowing process fluid to pass around the plunger, into and through the seat, and then on to connected piping. A soft PTFE valve seat allows effective sealing of the various valve components: the glass-coated plunger to the seat, the seat's flange top surface to the glass-coated nozzle flare/flange, and the seat's flange bottom surface to the valve's flange.

The use of known valve seats is illustrated in FIGS. 1 and 2. FIG. 1 is a cross-section view which schematically shows the orientation of a valve seat (1) within a glass lined nozzle (4) of a containment vessel. The cylindrical portion (2) of the valve seat resides within the nozzle (4), while the flange portion (3) of the valve seat (1) resides outside of the nozzle (4) and maintains the position of the valve seat (1) within the nozzle (4). FIG. 2 is a close up depiction of a portion of the valve seat (1) in close contact with the nozzle wall. As seen in FIG. 2, the nozzle wall includes a structural portion (6) typically made of metal, and a glass lined portion (7) having an uneven, irregular surface.

While effectively addressing the need for coupling glass lined vessels and valve assemblies, valve seats currently in use are also a major source of potential impurities and contaminants from the reaction residues. Referring again to FIGS. 1 and 2, it is noted that gaps or interstices (5) are formed between the cylindrical portion (2) of the valve seat and the glass lined portion (7) of the nozzle. In such valve seats, process residues (19) collect in gaps/interstices between the outside surface of the valve seat and the glass-lined inner, irregular surface of the nozzle. In certain chemical processes these residues may represent acceptable amounts of impurities. However, in the pharmaceutical industry, for example, such residues can represent serious contaminants.

The above-described problem of contaminants and impurities is exacerbated when the valve seat is used in connection with high temperature liquids. A PTFE valve seat exposed to high temperature liquids will generally attempt to expand, but will be prevented by the rigid glass lined nozzle. The PTFE material may then "set" in its constrained position, and later shrink when cooled. This shrinkage will result in a decreased outer diameter of the valve seat, and thus a larger gap in which potential contaminants can reside.

To prevent the accumulation of contaminants, the pharmaceutical manufacturer must remove the valve seat and manually remove the residues, often after every batch is processed. This cleaning is both expensive and time consuming, results in process down time, and risks damage to the valve seat and the glass it contacts—all factors which contribute to the overall cost of the manufacturing process.

Several approaches have been tried in attempts to address the contamination problem while minimizing the need to clean, and thus take off line, the valve components. For instance, one manufacturer has developed an inflatable valve seat wherein the inflated outer PTFE skin of the valve fills the space between the valve seat and the uneven surface of the glass-lined vessel's outlet nozzle. Such a valve seat device, however, has several disadvantages. First, any inflated component is susceptible to deflation, and thus failure in its intended purpose, as a result of puncture, excessive or extended wear and tear, leakage or any other reason for which inflated components are known to deflate. Further, an inflated component tends to have rounded surfaces, and thus contact between an inflated surface and rigid glass lining at certain points may be less than snug (e.g., where the curved inflated surface curves away from the irregular but substantially flat glass surface), possibly leading to the presence of crevices where contaminating residues can accumulate. Finally, component inflation adds to the expense necessitating an equipment to inflate and maintain proper inflation levels.

Several manufacturers, for example Xomox Corp. of Cincinnati, Ohio, employ "blade" or "windshield wiper" arrangements to form a seal or seals between the cylindrical valve seat portion and the glass lined nozzle. While this approach reduces the presence of contaminating residues to a degree, the use of a blade type seals is often costly, and more importantly, is less than effective in forming tight and lasting seals to prevent residue accumulation. For example, the arrangement described in Xomox's European patent application EP 0 863 338 A1 employs thin upper and lower blades which are pressed against the nozzle wall with the upper blade oriented in an upward angle and the lower blade oriented at a downward angle. Since there is no structural support for these thin blades and a very tight fit between nozzle and seat, it is likely that during installation one or both blades will not deploy properly (i.e., blades will be folded, creased, oriented at an unintended angle), leading to imperfect seals and accumulation of undesirable residues.

Other non-valve seat devices are similarly disadvantaged, for instance a nozzle repair seat which is the subject of U.S. Pat. No. 5,599,600, owned by Edlon, Inc. of Avondale, Pa. In this device, multiple blades (called "lips" in the patent) are meant to form seals with a vessel's glass lined nozzle surface to prevent contact between a damaged portion of the nozzle and the contents of the vessel. While O-rings are present between blades in certain embodiments of this device, it is clear that the blades, which extent well beyond the O-rings, are equally susceptible to deformations and disorientations during the installation process which will likely lead to the formation of improper seals.

OBJECTS OF THE INVENTION

In view of the above-described shortcomings in the art of valve assemblies useful in high purity process applications, it is an object of the present invention to provide a valve assembly which prevents or minimizes the accumulation of process residues.

It is another object of the present invention to provide valve assembly as aforesaid, which comprises a valve seat for forming a tight seal with a glass-lined inner surface of a nozzle, thereby reducing or eliminating cavities within the valve where such accumulation can occur.

It is still another object of the present invention to provide a valve assembly as aforesaid, which prevents or minimizes the accumulation of process residues by use of a flexible O-ring embedded in a valve seat. Preferably, the O-ring is positioned as near as possible to the inside of the glass lined vessel and as far as possible from the nozzle opening to minimize cavities and crevices where residues can accumulate.

It is a further object of the present invention to provide a valve assembly as aforesaid, wherein a chamber between the valve seat and the liner, normally inaccessible to cleaning, can be cleaned-in-place by means of flush ports built into the valve seat.

Further still, it is an object of the present invention to allow testing of critical clean-in-place seals by observation of fluid leaks (or the absence of such leaks) emanating from the flush ports.

It is yet another object of the present invention to prevent accumulation of process residue in the same inaccessible chamber, alternatively in certain cases, by injecting such chamber with a hardening elastomer or plastic compound that will block entry of contaminants.

Finally, it is an object of the present invention to provide a clean in place valve assembly which will afford users in the pharmaceutical industry the opportunity to obtain benefits including improved process purity, more flexibility in operations, reduced cost of operation, reduced downtime, and longer life for their valves.

SUMMARY OF THE INVENTION

The present invention is directed to a valve seats and a valve assembly incorporating such valve seats forming tight dual seals with a glass lined nozzles of a reagent or reaction vessels and which reduce or eliminate cavities and crevices between the valve seat and the nozzle, where residues can accumulate. The present invention employs a flexible valve seat body, typically but not necessarily PTFE, which is inserted into a glass lined nozzle or similar aperture. Preferably, the valve seat comprises a cylindrical component. The term "cylindrical" as used herein refers to portions which are tubular, and including "cylinders" having cross sections which are square, rectangular or otherwise non-circular.) The valve seat also includes a flange portion at its base to limit the degree of its insertion into the nozzle, and to provide a point of contact and/or attachment to portions of the valve assembly. The region of the cylindrical portion remote from the flange is designed to form a tight seal with the glass lined surface of the nozzle, and is further designed to eliminate gaps between the seat and the glass, and/or eliminate access to such gaps, where accumulation of residues can occur.

In accordance with an embodiment of the present invention, the above-mentioned objectives are accomplished via the cooperation of several design features. A first seal is formed by a downward angled "lip" positioned at the end of the valve seat cylinder most remote from the flange ("remote end"). The lip designed to be integral with the valve seat body, but extend to a radius slightly greater than that of the rest of the cylinder. A flexible O-ring is positioned just below and in contact with the lip, and can be embedded in a groove, for instance an annular groove in the valve seat. As with the lip, the outer diameter of the O-ring is slightly greater than the outer diameter of the main body of the cylindrical portion.

In operation, as the cylindrical portion of the valve seat is inserted into the nozzle the lip forms a seal with the nozzle wall. The downward angle of the lip ensures that it does not become folded or creased during insertion. The flexible O-ring serves dual purposes. First, it provides a close support beneath all or most of the length of the lip to maintain the lip in contact with the glass nozzle wall. A tight seal is obtained because the lips is firmly "sandwiched" between the wall and the O-ring. Second, since the diameter of the O-ring is greater than that of the cylinder, the O-ring forms a secondary seal with the nozzle wall. The secondary seal is facilitated by a limited downward movement (the non-rigid construction of the seat generally, and the lip specifically, permit the lip a degree of flexion) of the lip, which deforms the O-ring such that it more closely contacts the wall. Thus, two fluid tight seals are formed. Since the O-ring and lip for, tight seals at the uppermost tip of the cylindrical portion, residues generally cannot be deposited anywhere along the length of the seat-nozzle interface.

The above-recited design features permit clean-in-place operation by preventing process residue from accumulating in the relatively inaccessible interstices between the valve seat and the glass lining of the nozzle. Rather, process residues, if any, remain in regions of the valve and valve seat which are accessible to conventional cleaning materials. There is no need to disassemble process equipment, including the valves and valve seats employed in such processes, for cleaning. Processing delays, and risk of equipment damage, are avoided. In this way, the present invention permits the valve seat and valve to be cleaned-in-place.

To further enhance cleanliness, ports may be incorporated into the valve seat such that pressurized fluid is flushed into the interstices between the glass lining of the nozzle and the valve seat, thereby forcing any residue there present into the main chamber and then through the outlet of the valve. Additional ports may be incorporated into the valve assembly and/or its housing to clean not only the lip/seal area of the valve seat but also any valve components in the vicinity of the flush port(s).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

While the illustrated embodiments and features of the invention have been put forward, it is to be understood that the invention is not limited to the precise form illustrated, and that changes may be made thereto without departing from the spirit or substance of the invention.

DETAILED DESCRIPTION OF THE EMBODIMENTS

Figure 3:
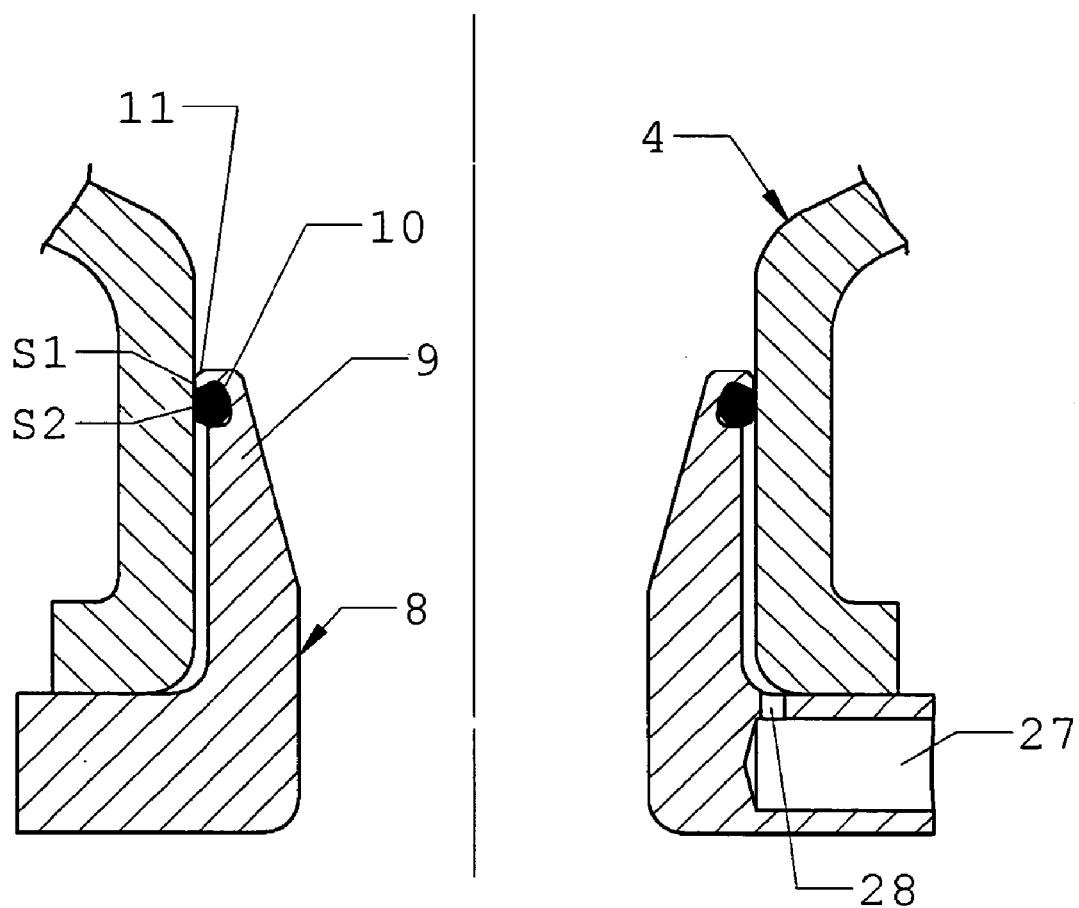
FIG. 3 is a cross-sectional view of the inventive valve seat positioned within a glass lined nozzle in accordance with an embodiment of the present invention.

As shown in FIG. 3, in accordance with an embodiment of the present invention, the inventive valve seat (8) is positioned within a glass lined nozzle (4). The cylindrical portion (9) of the inventive valve seat includes a lip (11) and an O-ring (10) which interact to form first and second seals (S1 and S2) with the nozzle wall.

Figure 4A:
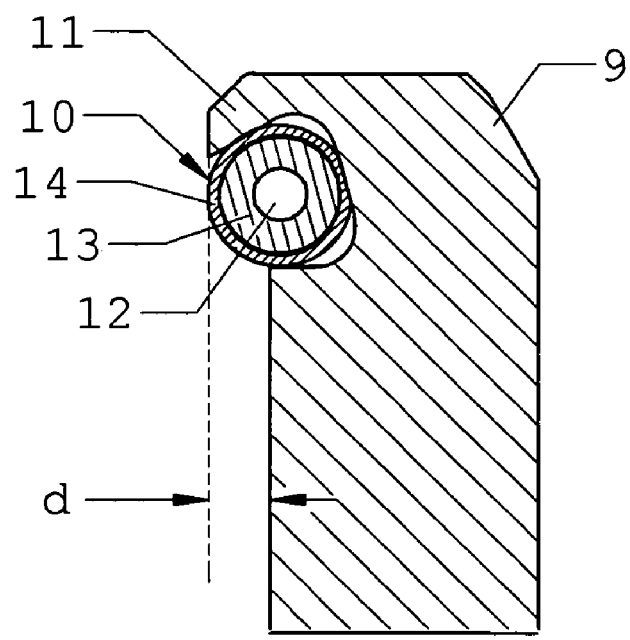
FIGS. 4a and 4b are close up cross-sectional views of portions of the inventive valve seat of FIG. 3.
Figure 4B:
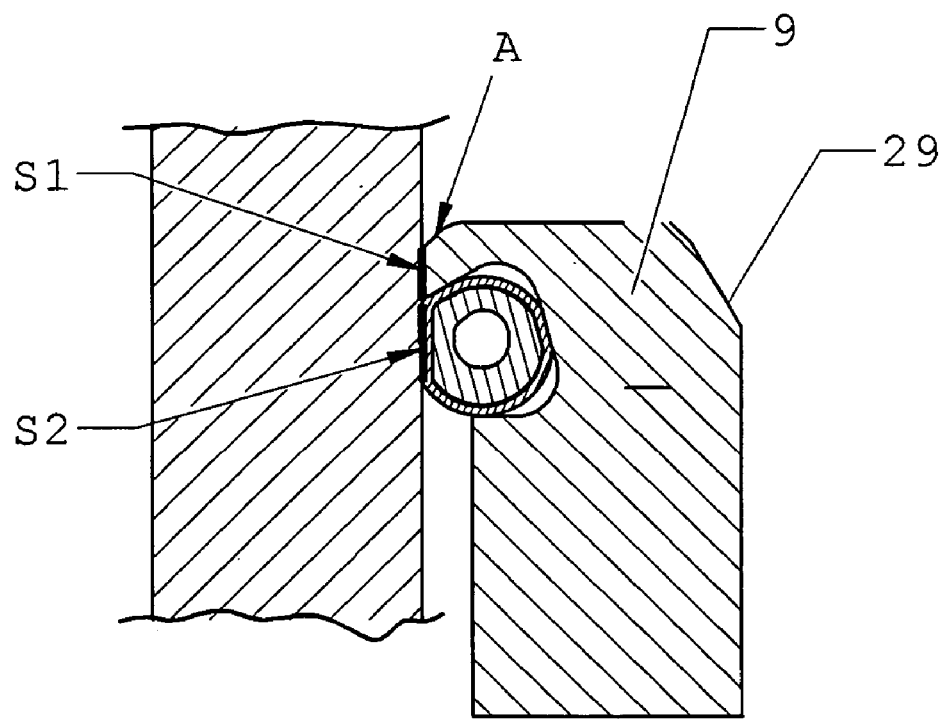

FIGS. 4a and 4b provide close up views of one side of the cylindrical portion (9) of an embodiment of the inventive valve seat before (FIG. 4a) and after (FIG. 4b) it contacts the nozzle wall. Referring to FIG. 4a, in accordance with an embodiment of the present invention, the cylindrical portion are formed to incorporate a lip (11) which extends a distance "d" beyond the main outer wall of the cylindrical portion (9). Beneath the lip is a flexible O-ring (10). In accordance with an embodiment of the present invention, the O-ring (10) comprises a hollow core (12) surrounded by a rubber or silicone region (13) which is encapsulated in a layer of inert material (14) such as Flourinated Ethylene Propylene (FEP). However, it is appreciated that other flexible rings may be used depending on application and conditions of use. The O-ring (10) also extends a distance of approximately distance "d" beyond the main outer wall of the cylindrical portion (9), the precise distance need not be "d" exactly. It is to be appreciated that the lip (11) is supported over a significant portion of its length by the O-ring (10), and does not extend outward significantly further than the O-ring (10).

In accordance with an embodiment of the present invention, FIG. 4b depicts the cylindrical portion (9) as it is deployed within a nozzle (4). Preferably, the cylindrical portion (9) comprises a slope surface (29). During deployment, contact with the nozzle wall forces the flexible lip (11) downward in the direction indicated by arrow A. A first seal (S1) is formed between the lip (11) and the wall as a result of the lip (11) and wall pressing into one another. The first seal (S1) is reinforced and strengthened by additional outward pressure exerted by the O-ring (10) on the lip (11). The additional pressure results directly from the compression of the O-ring (10) by the downward pressure of the lip (11) and the inward pressure from the nozzle wall. A second seal (S2) is formed between the O-ring (10) and the nozzle wall, as downward pressure from the lip (11) deforms the O-ring (10) such that it is forced outward and against the nozzle wall.

FIGS. 4a and 4b also show the advantageous feature of the present invention such as avoiding the folding, creasing and other problems often associated with blade type seals. In accordance with an embodiment of the present invention, the lip (11) is angled in a downward direction. Deployment of the valve seat (8) involves a "one-way" insertion of the valve seat (8) into a nozzle (4). In the course of this insertion of the valve seat (8) into the nozzle (4), the downward angling of the lip (11) allows for easy deployment, since the lip (11) is already "bent" in the proper direction. Moreover, the presence of the O-ring (10) below the lip (11) supports the position of the lip (11) such that it cannot fold, crease or otherwise become deformed.

It is appreciated that the above-described inventive sealing features sharply reduce or altogether eliminate the accumulation of residues in the vicinity of the valve seat (8). This permits the valve and valve seat (8) to be cleaned in place.

Figure 5:
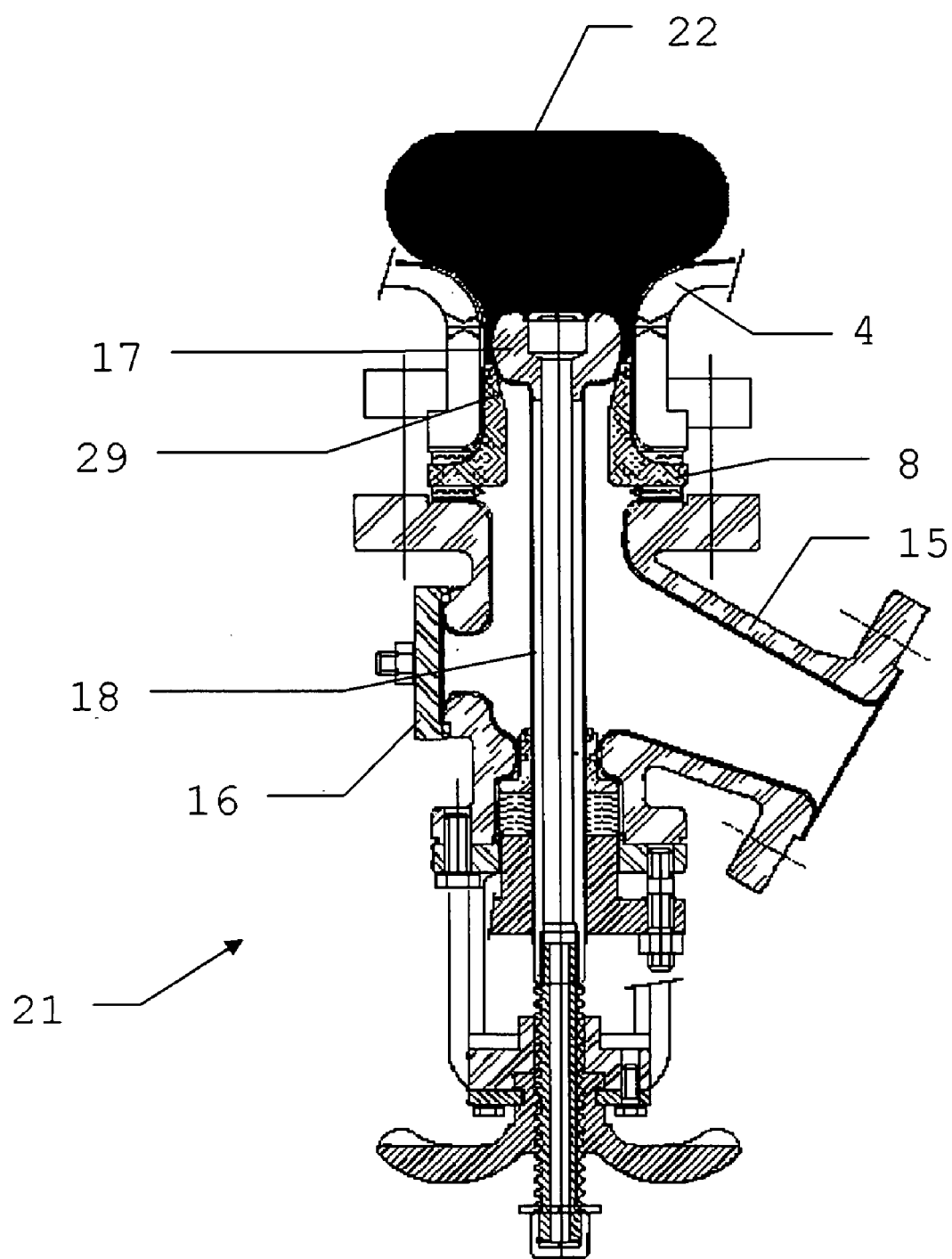
FIG. 5 is a cross-sectional view of the valve assembly of the present invention which incorporates the inventive valve seat, wherein a reagent is prevented from flowing through the valve assembly as a result of the seal formed between a stopper and the valve seat.
Figure 6:
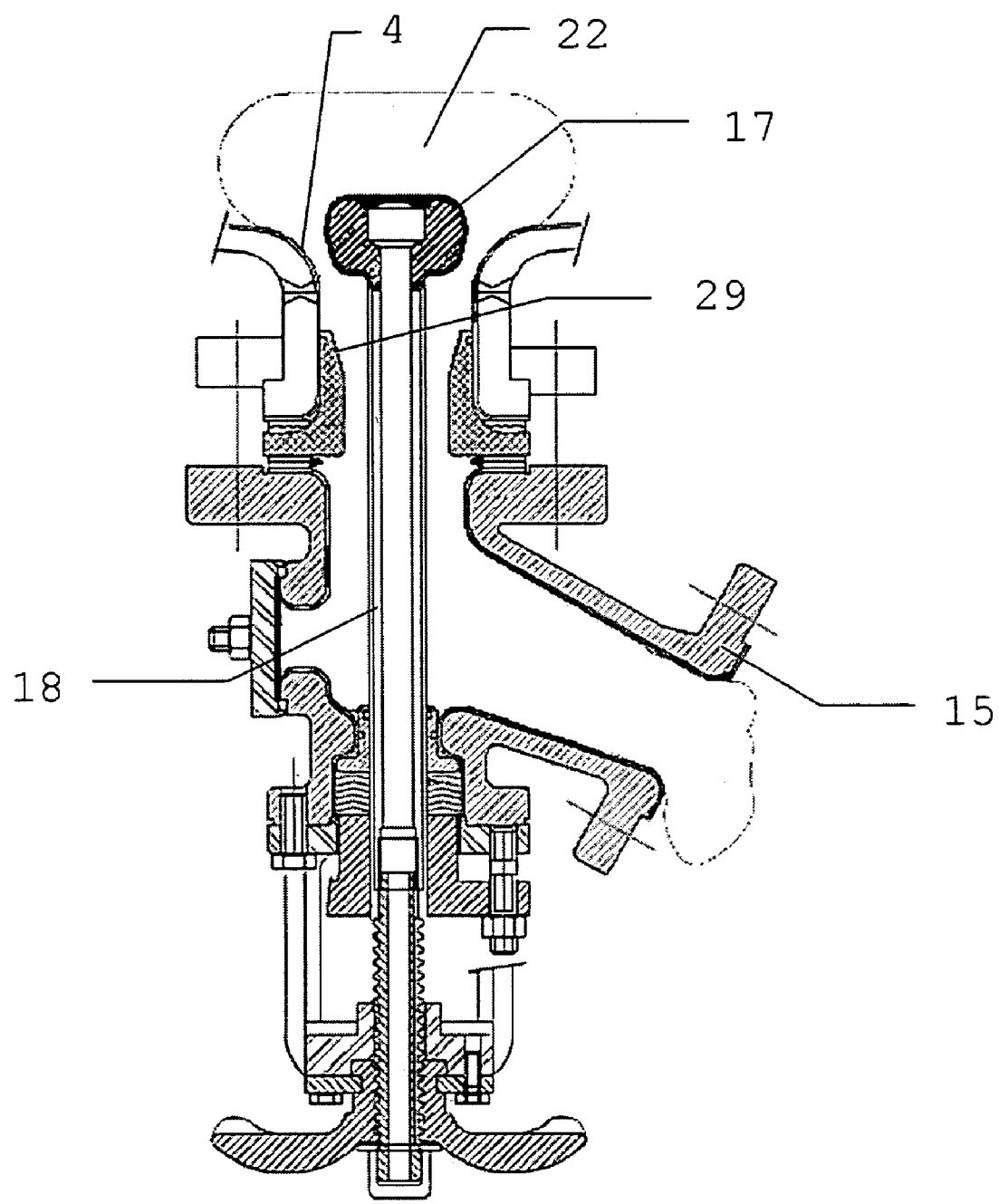
FIG. 6 is a cross-sectional view of the valve assembly of the present invention which incorporates the inventive valve seat, wherein the stopper is not in contact with the valve seat, permitting the reagent to flow through the valve assembly.

FIG. 5 depicts a valve assembly (21) which has been fitted with the inventive valve seat (8) and comprises a stem (18), an outlet port (15), and a flush port (16). A reagent (22) is maintained in position above the valve assembly (21) due to a seal created between a stopper (17) and the sloped surface (29) of valve seat (8). In FIG. 6, a stem (18) causes the stopper (17) to lift, permitting the reagent (22) to flow between the sloped surface (29) and the stopper (17), and thus through the valve and the outlet (15). The stopper (17) is then lowered to arrest the flow of the reagent (22) (not pictured) and the process employing the reagent (22) continues to completion.

Before the process can be reinitiated (i.e., to run a second batch) it is often desirable to clean the valve. Cleaning in place takes place when cleaning fluids, solvent and other materials (collectively "cleaning solutions") are caused to contact the process components, including the valve and its valve seat, without disassembling these components. It should be noted that the cleaning in place is made possible in the present invention by the lip/O-ring double seals (S1 and S2). Any number of methods can be used to clean in place in connection with these sealing features.

Figure 7:
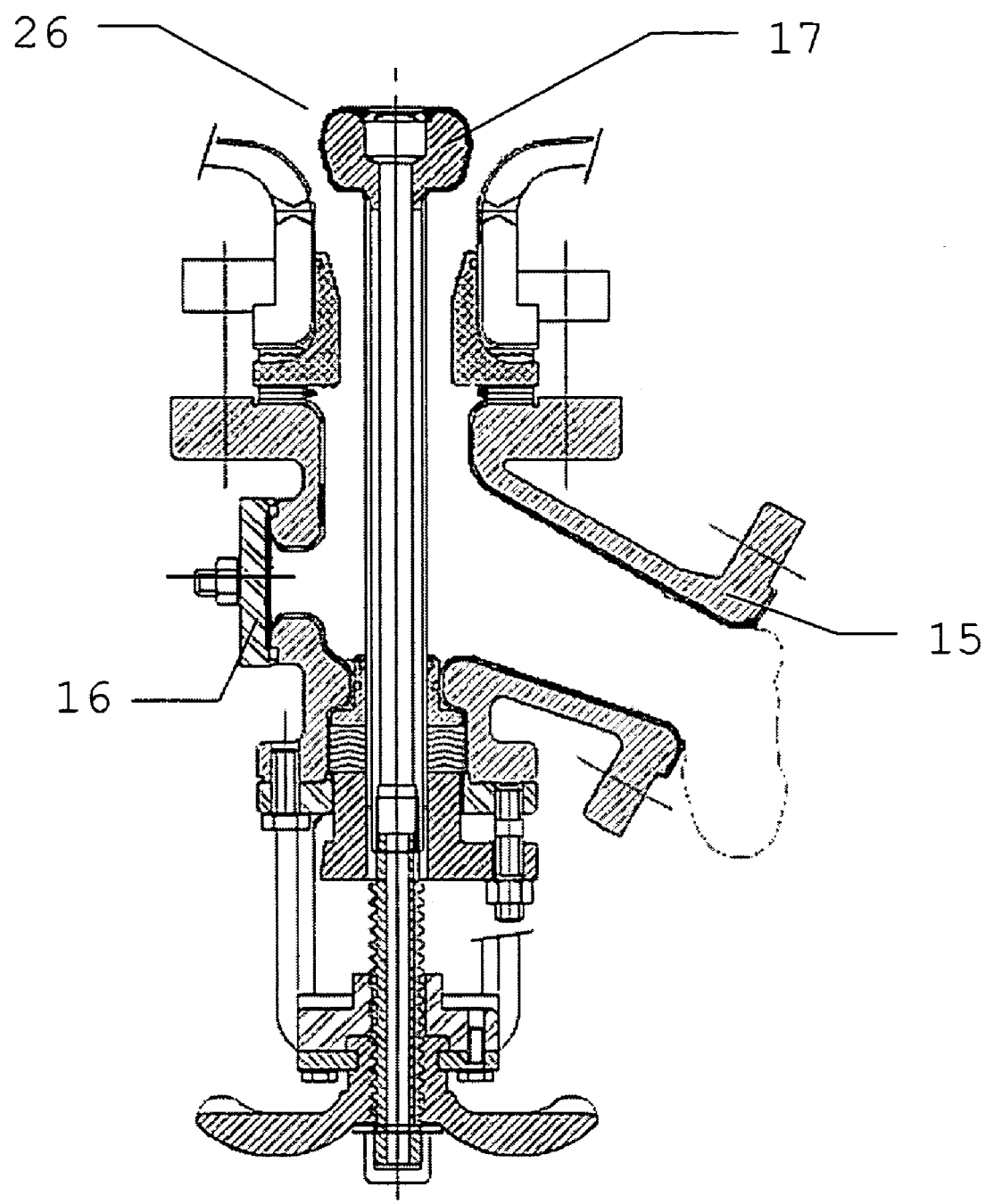
FIG. 7 is a cross-sectional view of the valve assembly of the present invention which incorporates the inventive valve seat, wherein the flush port is in the open position, and wherein a cleaning solvent is being flushed through the valve assembly.
Figure 8:
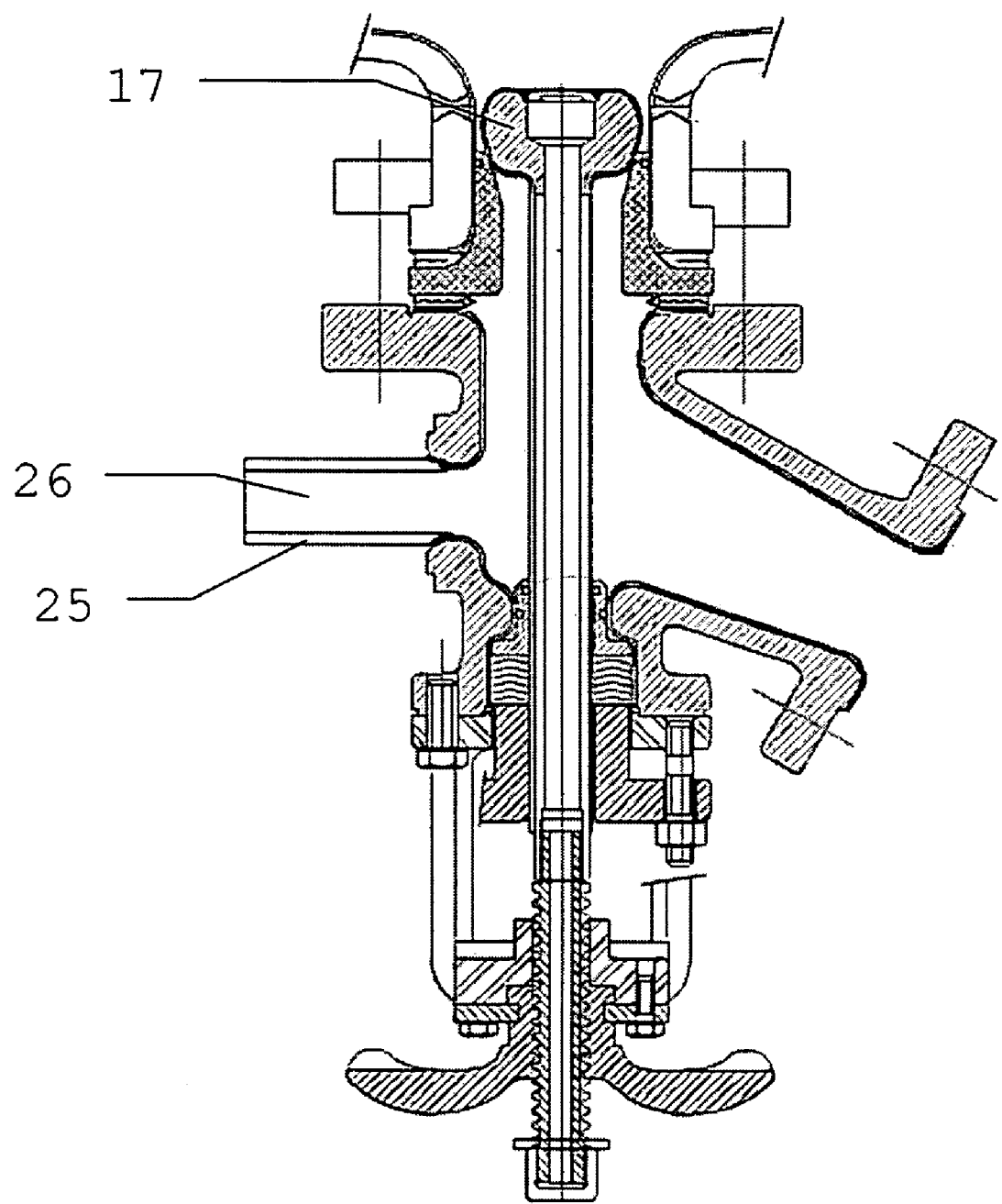
FIG. 8 is a cross-sectional view of the valve assembly of the present invention which incorporates the inventive valve seat, wherein the flush port is open and the valve stopper is also open.

FIGS. 7 and 8 depict two of the many embodiments of the present invention in which the cleaning in place can occur. In FIG. 7, a flush port (16) is left in place and the vessel is cleaned with the stopper (17) in the open position allowing cleaning fluid (26) to clean the entire valve assembly (21). In FIG. 8, flush port (16) of FIG. 7 has been removed and a pipe (25) introduced to allow flow of cleaning fluid (26) into the lower valve assembly (21). In this embodiment, stopper (17) is in the closed position to prevent cleaning fluid (26) from entering the vessel above the valve. After the flushing procedure, the flush ports (16) are closed to permit further processing. Since little or no residue are collected between the valve seat (8) and the nozzle (4) during the earlier processing, it is appreciated that the cleaning in place procedure is sufficient and no disassembly of the valve assembly is needed or desired.

Figure 1:
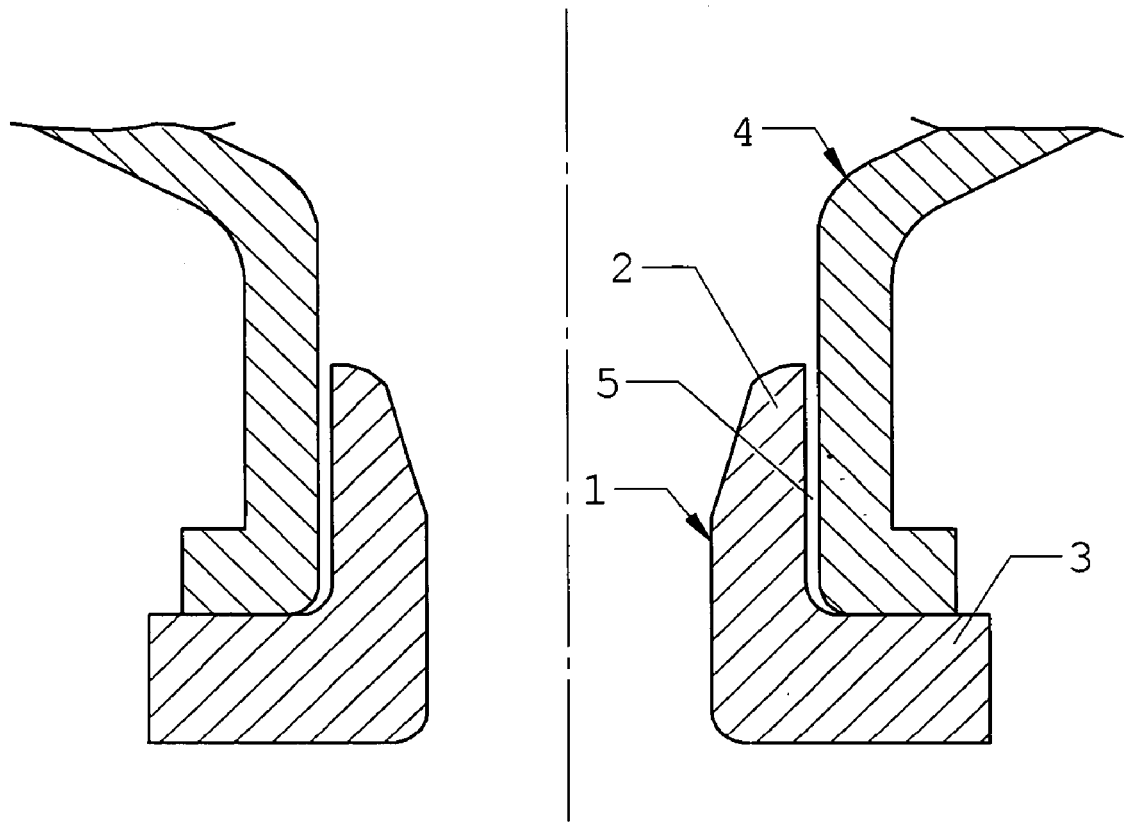
FIG. 1 is a cross-sectional view of a prior art valve seat positioned within a glass lined nozzle.
Figure 2:
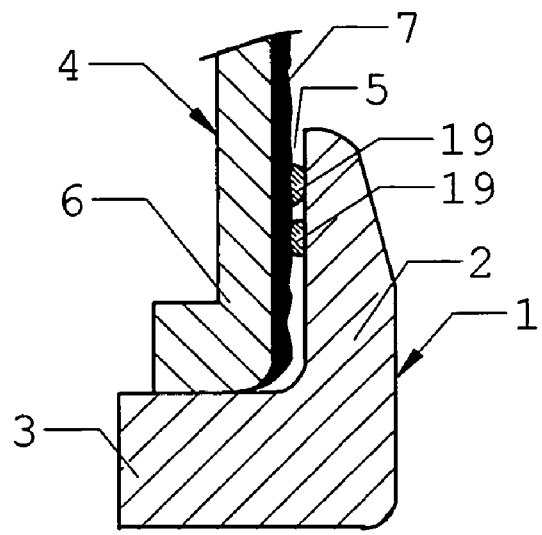
FIG. 2 is a close up cross-sectional view of a portion of a portion of a prior art valve seat in close contact with a portion of a glass lined nozzle.
Figure 9:
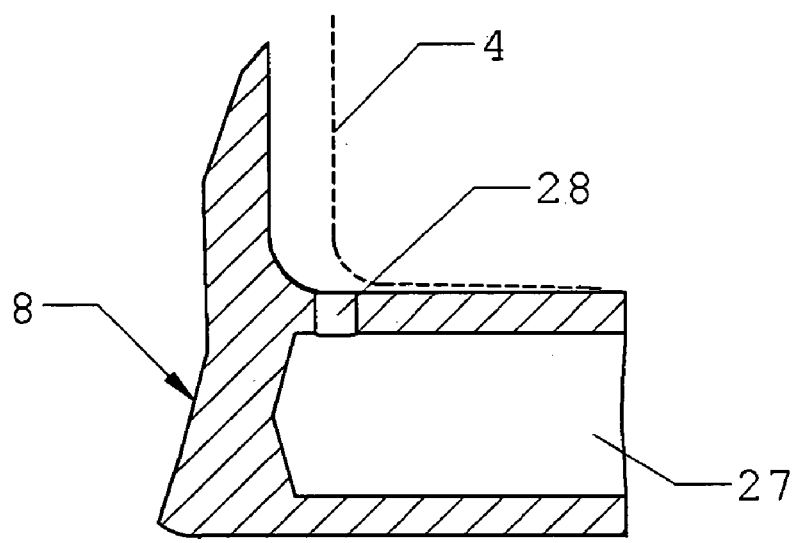
FIG. 9 is a cross-sectional view of a portion of the inventive valve seat equipped with a port incorporated into the outer diameter of the valve seat.

FIG. 9 depicts an embodiment of the present invention wherein a port or ports (27, 28) are provided within the valve seat (8) itself to further ensure the cleanliness (i.e., prevention minimization of residue buildup) resulting from the clean in place design features of the present invention. FIG. 9 is a detailed drawing of the lower right-hand portion of FIG. 3. It is seen that a substantially horizontal port (27) intersects and communicates with a substantially vertical port (28). The ports (27, 28) are capable of several uses. Used as flush ports, the horizontal port (27) is connected to a pressurized source of flushing fluid. The pressurized flushing fluid is forced between the outer diameter of the valve seat cylinder (9) and the glass lined surface of the nozzle (4), and past the flexible O-ring (10) and lip (11) (see FIGS. 4a and 4b). The O-ring and lip seals (S1 and S2) are reestablished upon cessation of pressurized flushing.

In addition to these direct cleaning functions, the ports (27, 28) described in FIG. 9 are also useful in other ways that promote cleanliness somewhat indirectly. For example, a hardening fluid, for instance comprising an elastomer or a plastic polymer, may be forced through the ports (27, 28) such that any gaps/interstices (5) between the valve seat (8) and the glass lined nozzle (4) are permanently filled. Used in another manner, the ports (27, 28) may be employed to watch and test for evidence of leakage from the glass lined vessel through the O-ring and lip seals (S1 and S2). Notably, the ports (27) and (28) are used for all of the described purposes regardless of whether the valve is in an open or closed position.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A valve seat comprising a cylindrical portion and a flange portion, a section of said cylindrical portion remote from said flange further comprising a lip member and a support member in contact with said lip member, said lip member and said support member substantially circumscribing said cylindrical portion;

said lip member and seal support member, each extending short distances radially outward from an outer surface of said cylinder; and said lip member and said support member, each capable of forming fluid tight seals with the walls of a nozzle; and wherein said lip member moves toward said support member when said valve seat is installed in said nozzle, thereby compressing said support member which exerts pressure on said lip member to maintain said fluid tight seals with the walls of said nozzle.

2. The valve seat of claim 1, further comprising one or more fluid ports within said valve seat which communicate between a fluid source and interstices between said outer surface of said cylinder and said nozzle wall.

3. The valve seat of claim 1, wherein said lip member is angled toward said flange.

4. The valve seat of claim 1, wherein said support member is an O-ring.

5. The valve seat of claim 4, wherein said O-ring comprises an inert material.

6. A valve employing the valve seat of claim 1.

7. A method employing the valve of claim 6, wherein said valve is cleaned after use without disassembling said valve.

8. A method for removing contaminants from interstices between an outer surface of a valve seat and a nozzle wall, said valve seat comprising one or more fluid ports which communicate between a fluid source and said interstices, comprising the steps of:
   forcing said fluid through said one or more ports of said valve seat and into said interstices to remove said contaminants from outside of said valve seat and said interstices regardless of the position of said valve seat; and
   substantially removing said fluid containing said contaminants from said interstices to minimize the accumulation of said contaminants in inaccessible interstices between said valve seat and said interstices.

9. The method of claim 8, wherein said fluid is forced through said interstices and past a sealing means.

10. A method for preventing the accumulation of contaminants in interstices between an outer surface of a valve seat and a nozzle wall, said valve seat comprising one or more fluid ports which communicate between a fluid source and said interstices, comprising the steps of:
   forcing a fluid capable of hardening through said one or more ports of said valve seat and into said interstices; and
   allowing said fluid to harden in said interstices to block entry of said contaminants into said interstices, thereby minimizing the accumulation of said contaminants in said interstices between said outer surface of a valve seat and said nozzle wall.

11. The method of claim 10, wherein said fluid is an elastomer.

12. The method of claim 10, wherein said fluid is a plastic polymer.

13. A method for evaluating the effectiveness of one or more seals between an outer surface of a valve seat and a nozzle wall of a fluid containing vessel, said valve seat comprising one or more fluid ports which communicate with interstices between said surface and wall, comprising the step of observing whether said fluid flows through one or more of said ports of said valve seat.

* * * * *